(12) United States Patent
Engelhardt (10) Patent No.: US 12,104,902 B2
(45) Date of Patent: Oct. 1, 2024

(54) METHOD AND APPARATUS FOR DETECTING CHANGES IN DIRECTION OF A LIGHT BEAM

(71) Applicant: Max-Planck-Gesellschaft zur Foerderung der Wissenschaften e.V., Munich (DE)

(72) Inventor: Johann Engelhardt, Bad Schoenborn (DE)

(73) Assignee: Max-Planck-Gesellschaft zur Foerderung der Wissenschaften e. V., Munich (DE)

( * ) Notice: Subject to any disclaimer, the term of this patent is extended or adjusted under 35 U.S.C. 154(b) by 479 days.

(21) Appl. No.: 17/234,982

(22) Filed: Apr. 20, 2021

(65) Prior Publication Data

US 2021/0239452 A1    Aug. 5, 2021

Related U.S. Application Data

(63) Continuation of application No. PCT/EP2019/078245, filed on Oct. 17, 2019.

(30) Foreign Application Priority Data

Oct. 24, 2018   (DE) .................... 10 2018 126 544.1

(51) Int. Cl.
*G01B 9/02*      (2022.01)
*G01B 9/02098*   (2022.01)
(Continued)

(52) U.S. Cl.
CPC ..... *G01B 9/02098* (2013.01); *G01B 9/02041* (2013.01); *G01B 11/26* (2013.01);
(Continued)

(58) Field of Classification Search
CPC ............ G01B 9/02098; G01B 9/02041; G01B 11/26; G01B 9/02015; G02B 5/04;
(Continued)

(56) References Cited

U.S. PATENT DOCUMENTS

| 5,218,425 A | 6/1993 | Oono | |
|---|---|---|---|
| 6,563,593 B2 * | 5/2003 | Hill | ........................ G01B 11/26 356/491 |

(Continued)

FOREIGN PATENT DOCUMENTS

| CN | 101858788 A | 10/2010 |
|---|---|---|
| CN | 105698710 A | 6/2016 |

(Continued)

OTHER PUBLICATIONS

M. D. Turner, et al.: "Picoradian deflection measurement with an interferometric quasi-autocollimator using weak value amplification", Optics Letters, Apr. 15, 2011, vol. 36, No. 8, p. 1479-1481.
Park, J. und Cho, K.: "High-precision tilt sensor using a folded Mach-Zehnder geometry in-phase and quadrature Interferometer", Appl. Opt. vol. 55, 2016, No. 9, p. 2155-2159, DOI: 10.1364/AO. 55.002155.

(Continued)

*Primary Examiner* — Jonathan M Hansen
(74) *Attorney, Agent, or Firm* — The Sladkus Law Group (57) ABSTRACT

In a method of detecting changes in direction of a collimated coherent light beam, the light beam is split into partial light beams which are superimposed on a camera to form an interference pattern displaying light intensity minima and maxima alternatingly following to one another in a transverse direction oriented transversely to an average propagation direction of the partial beams. The light beam is focused into at least one focus located in front of the camera. Pictures of the interference pattern including a plurality of the light intensity maxima are registered with the camera. An (Continued)

average shift of the plurality of light intensity maxima with regard to the camera in the at least one transverse direction is determined from the pictures. A change in angular orientation of the collimated coherent light beam in the at least one transvers direction is deduced from the average shift.

20 Claims, 9 Drawing Sheets (51) Int. Cl.
 G01B 11/26 (2006.01)
 G02B 5/04 (2006.01)
 G02B 21/00 (2006.01)
 G06T 7/33 (2017.01)
 G06T 7/73 (2017.01)
(52) U.S. Cl.
 CPC ............ G02B 5/04 (2013.01); G02B 21/0036 (2013.01); G02B 21/008 (2013.01); G06T 7/33 (2017.01); G06T 7/74 (2017.01)
(58) Field of Classification Search
 CPC .... G02B 21/0036; G02B 21/008; G06T 7/33; G06T 7/74
 See application file for complete search history.

(56) References Cited

U.S. PATENT DOCUMENTS

| 8,842,291 | B2 | 9/2014 | Turner et al. |
| 2002/0033951 | A1* | 3/2002 | Hill ..................... G01B 11/26 356/519 |
| 2003/0160969 | A1 | 8/2003 | Endo et al. |
| 2012/0200840 | A1 | 8/2012 | Embry |

FOREIGN PATENT DOCUMENTS

| CN | 108020179 A | 5/2018 |
| JP | H03115809 A | 5/1991 |
| JP | H0611388 A | 1/1994 |

OTHER PUBLICATIONS

Hogan J. et al.: "Precision angle sensor using an optical lever inside a Sagnac interferometer", Opt. Lett. vol. 36, 2011, No. 9, p. 1698-1700.
Putman, A. J. et al.: "A detailed analysis of the optical beam deflection technique for use in atomic force microscopy", Journal of Applied Physics, vol. 72, No. 6 (1992).
K. Tyszka, et al. Laser Beam Angular Stabilization System based on a Compact Interferometer and a Precise Double-Wedge Deflector, Rev. Sci. Instrum. 89, 085121 (Aug. 29, 2018).

* cited by examiner

METHOD AND APPARATUS FOR DETECTING CHANGES IN DIRECTION OF A LIGHT BEAM

CROSS REFERENCE TO RELATED APPLICATIONS

This application is a continuation of International Application PCT/EP2019/078245 with an international filing date of Oct. 17, 2019 and claiming priority to co-pending German Patent Application No. DE 10 2018 126 544.1 entitled "Verfahren and Vorrichtung zum Erfassen von Richtungsänderungen eines Lichtstrahls", filed on Oct. 24, 2018.

FIELD OF THE INVENTION

The invention relates to a method and an apparatus for detecting changes in direction of a coherent light beam. These changes in direction mean changes in angular orientation, i.e. changes in beam angle of the coherent light beam. Correspondingly, the indications change in direction, change in angular orientation and change in beam angle and also the indications direction, angular orientation and beam angle are used synonymously here.

BACKGROUND OF THE INVENTION

In a known method of detecting changes in direction of a coherent light beam, the light beam is directed onto a segmented detector, in the simplest case on a four quadrant diode, and the relative intensity variations over the detector segments are measured. In this case, the measurement values are, as a rule, also dependent on the beam intensity and the gradient of the beam intensity and have to be calibrated accordingly.

The use of an "interferometric quasi-autocollimator (iQuAC)" using so-called "weak value amplification" in measuring changes in angular orientation of a target mirror is known From M. D. Turner, et al.: "Picoradian deflection measurement with an interferometric quasi-autocollimator using weak value amplification", Optics Letters, Apr. 15, 2011, Vol. 36, No. 8, p. 1479-1481 and U.S. Pat. No. 8,842,291. In the iQuAC, incident laser light is split into two partial beams, and, after reflection at the target mirror, the two partial beams are guided along two different ways which differ by an odd integer of further reflections and superimposed on a position-sensitive photodetector. A slight mismatch with regard to two beam paths of the partial beams, which, if of exactly same lengths, would result in a complete destructive interference on the position-sensitive photodetector, results in a light spot on the position-sensitive photodetector which moves with a change in the angular orientation of the target mirror. By means of detecting this movement, the change in angular position can be detected. On the other hand, the iQuAC is insensitive with regard to translations of the target mirror.

The iQuAC is based on a known optical autocollimator. An optical autocollimator for measuring changes in the angular orientation of a target mirror collimates light coming from a point light source by means of a lens and directs the collimated light onto the target mirror. By the same lens, the collimated light reflected by the target mirror is focused onto a position-sensitive photodetector. Autocollimators respond to angular deflections of the target mirror, whereas they are insensitive to translations of the target mirror. Autocollimators do not measure a beam angle of an externally supplied light beam.

From Park, J. and Cho, K.: "High-precision tilt sensor using a folded Mach-Zehnder geometry in-phase and quadrature interferometer", Appl. Opt. Vol. 55, 2016, No. 9, p. 2155-2159, DOI: 10.1364/AO.55.002155, it is known to arrange a focusing lens in front of the photodetector to increase the dynamic range of a method of determining the tilt of a target mirror as described in the two previous paragraphs.

The use of a Sagnac interferometer for detecting the angular orientation of a mirror within the setup of the interferometer is known from Hogan J. et al.: "Precision angle sensor using an optical lever inside a Sagnac interferometer", Opt. Lett. Vol. 36, 2011, No. 9, p. 1698-1700. For monitoring the overlap of a partial beam deflected by the target mirror and a partial beam serving as a reference, a small fraction of the superimposed partial beams are directed onto a CCD-Camera. A shift of the interference pattern with the angle of the target mirror is determined by means of a four quadrant diode onto which the major fractions of the superimposed partial beams are directed.

A method of continuously measuring the index of refraction of a medium, in which, in a setup according to a Michelson-Interferometer, a light beam guided through boundary surfaces bounding the medium at an angle other than 90% is superimposed with a reference beam to form an interference pattern, is known from US patent application publication 2012/0 200 840 A1. Lateral distances of intensity maxima of the interference patterns are detected with a camera to measure different deflection angles of the light beam at the boundary surfaces.

A method of determining the deviation of a light beam in atomic force microscopy is known from Putman, A. J. et al.: "A detailed analysis of the optical beam deflection technique for use in atomic force microscopy", Journal of Applied Physics, Vol. 72, No. 6 (1992). Here, a collimated laser beam is split into two collimated partial beams, one of which is reflected at a base and one of which is reflected at a free end of a cantilever deflected by the atomic force, wherein the two reflected collimated partial beams are afterwards superimposed by means of a lens to form an interference pattern. A deflection of a tip at the free end of the cantilever results in a shift of the interference pattern on a divided detector.

There still is a need of a method and an apparatus for detecting changes in direction of a coherent light beam, which, at comparatively low apparatus expenditures, allow for detecting a beam angle of the light beam at a high accuracy.

SUMMARY OF THE INVENTION

The present invention relates to a method of detecting changes in direction of a collimated coherent light beam. The method comprises splitting the light beam into at least two partial light beams, and superimposing the at least two partial light beams on a camera such as to form an interference pattern displaying light intensity minima and light intensity maxima alternatingly following to one another in at least one transverse direction oriented transversely to an average propagation direction of the at least two partial beams. The method further comprises, prior to or after splitting the light beam, focusing the light beam into at least one focus located in front of the camera. The method further comprises registering pictures of at least a part of the interference pattern including a plurality of the light intensity maxima with the camera, determining an average shift of the plurality of light intensity maxima with regard to the camera in the at least one transverse direction from the pictures registered with the camera, and deducing a change in angular orientation of the collimated coherent light beam in the at least one transvers direction from the average shift of the plurality of light intensity maxima with regard to the camera in the at least one transverse direction.

The invention also relates to an apparatus for detecting changes in direction of a collimated coherent light beam. The apparatus comprises an interferometer configured and arranged for splitting the light beam into at least two partial light beams and for superimposing the at least two partial light beams on a camera such as to form an interference pattern displaying intensity minima and intensity maxima alternatingly following to one another in at least one transverse direction oriented transversely to an average propagation direction of the at least two partial beams, and a camera configured and arranged for registering pictures of at least a part of the interference pattern including a plurality of the intensity maxima. The apparatus further comprises a focusing optic configured and arranged, in front of, within or behind the interferometer, for focusing the light beam into at least one focus in front of the camera, and an evaluation device configured for determining an average shift of the plurality of light intensity maxima with regard to the camera in the at least one transverse direction from the pictures registered with the camera.

The invention also relates to a beam stabilizer for stabilizing an angular orientation of a collimated coherent light beam. The beam stabilizer comprises an apparatus according to the invention for detecting changes in direction of the coherent light beam.

The invention also relates to a laser-scanning microscope. The laser-scanning microscope comprises a laser providing a collimated coherent light beam and a beam stabilizer according to the invention for the collimated coherent light beam.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

If, for example, in a scanning-light microscope, a focused illumination light beam which is used for scanning a sample, is to be positioned at an accuracy in an order of 1 nanometer, a beam angle of the illumination light beam has to be controllable and measureable at an accuracy of clearly better than 1 μrad. 1 μrad corresponds to 1 mm lateral deviation at a distance of 1 km.

However, thermal instabilities due to material expansions and air movements often result in positioning inaccuracies above these values, even under regular laboratory conditions. Often, drifts of illumination light beams and objects relative to an objective lens of a scanning-light microscope in an order of 1 nm/s are observed so that already the accuracy of measurements which take several seconds is essentially affected by drift effects.

To be able to compensate for drift effects or to correct drift effects in a measurement, beam angles have to be measureable both at accuracies in the order of nrad and robustly.

In a method of detecting changes in direction of a collimated coherent light beam according to the present disclosure, the light beam is split into at least two partial light beams. The at least two partial light beams are superimposed for forming an interference pattern which has intensity minima and intensity maxima alternatingly following to one another in a transverse direction oriented transversely to an average propagation direction of the at least two partial beams. At least a part of the interference pattern, the part including a plurality of intensity maxima, is registered with a camera, and changes in position of the light intensity maxima with regard to the camera are determined from the pictures of the camera.

In that the changes in position of a plurality of light intensity maxima with regard to the camera are determined, the accuracy at which the change in direction of the coherent light beam is determined based on changes in position of the interference pattern is increased by a factor $\sqrt{N}$, wherein N is the number of the intensity maxima. Thus, it is directly apparent that a high number N of light intensity maxima of the part of the interference pattern which is registered with the camera is an advantage. Typically, the number of the registered intensity maxima will be at least 10, often it is at least 20, it may at least 50 and even at least 100. It is to be understood that a distance between neighboring intensity maxima resulting from the number of the intensity maxima registered with the camera has to be adapted to the intensity of the pixels of the camera. For an unambiguous measurement, there have to be more than 2, preferably more than 3 pixels per period of the interference pattern. Even more preferably, the camera has at least 4 pixels per period of the interference pattern in each direction. Correspondingly, with a camera having 100 pixels neighboring in a row or line in the respective direction, up to 25 intensity maxima following to one another in this direction can be registered at maximum sensitivity with regard to their changes in position.

In the method according to the present disclosure, the preferable high number of light intensity maxima may result from their sequence not only in the at least one transverse direction, but in both transverse directions oriented transversely to the average propagation direction of the at least two partial beams and thus in both directions of main extensions of the image sensor of the respective camera. Correspondingly, with a camera of 100×100 pixels up to 25×25 light intensity maxima can be registered with spatial resolution.

In contrast to the prior art referenced above, it is not the change in direction of one of the two partial beams into which the coherent light beam is split that is detected according to the present disclosure, but the change in direction of the light beam as such. For this purpose, the light beam is also not superimposed with a reference beam but split into two partial beams which are generally both affected by the changes is direction of the coherent light beam to a same extent. These two partial beams are then superimposed to form the interference pattern which has the plurality of light intensity maxima and which is registered with the camera.

In the method according to the present disclosure, the light beam is a collimated light beam which is focused in at least one focus located in front of the camera. Thus, the interference pattern is formed between spherical waves starting from real or virtual focal points of the partial beams. The relative distances of the focal points are determined by the splitting of the light beam into the at least two partial beams. The absolute positions of the focal points and, as a consequence, the positions of the light intensity maxima with regard to the camera depend on the angular orientation, i.e. the beam angle of the collimated light beam with regard to the focusing optic but not on its lateral beam position. Thus, the method according to the present disclosure is selectively sensitive to the angular orientation, i.e. the beam angle of the light beam. Further, it proves to be advantageous that the spherical waves superimposed to form the interference pattern, even with small relative distances of the focal points, already over a short distance to the focal points result in a two-dimensional distribution of a plurality of light intensity maxima on the camera.

Generally, the collimated light beam may be focused into the focus only after being split into the at least two partial beams. However, the focusing preferably occurs already prior to the splitting into the at least two partial beams. However, this does not necessarily mean that the focus is already located in front or upstream of the splitting into the at least two partial beams. If the focus is located in front of the splitting into the at least two partial beams, the two spherical waves of the partial beams have different virtual focal points as their origins. If the focus is located behind the splitting, the origins are different real focal points.

In the method according to the present disclosure, an average shift of the plurality of the light intensity maxima with regard to the camera in the at least one transverse direction is determined, and a change in angular orientation in this transverse direction is deduced from this average shift. This is possible, if the interference pattern "shifts" with the change in angular orientation in this at least one transverse direction. This is the case, if each of the at least two partial beams, in the course of splitting the light beam into the at least to partial beams and in the course of superimposing the partial beams for forming the interference pattern, is reflected $n_i$-times, wherein i designates the index of the respective partial beam and wherein the numbers $n_i$ of the reflections do not differ at all or differ by an even integer. With each reflection of the partial beams, the direction of their change in angular orientation is reversed. If the numbers of these orientation reversals do not differ at all or differ by an even integer, at least the directions of the changes in angular orientation of both partial beams are equal. This results in that, at least as a first approximation, the interference pattern does not change with a change in angular orientation of the light beam, but only moves in the same direction in which the angular orientations of both partial beams change.

In the method according to the present disclosure, a change in an average distance of the plurality of light intensity maxima in the at least one transverse direction may additionally be determined from the pictures of the camera. In the execution of the method according to the present disclosure, a constant average distance of the plurality of light intensity maxima may be used as a stability criterion. If the light beam is split into two partial beams, wherein the numbers of the reflections of the two partial beams differ by an odd integer, the interference pattern resulting from the superposition of the partial beams does not shift as a whole with a change in angular orientation of the light beam. Instead, essentially only the average distance of the intensity maxima changes in the direction of the change in angular orientation. Vice versa, a low dependency of the average distance of the light intensity maxima of the interference pattern and of the overall shape of the interference pattern results in a central area of the previously described shifting interference pattern. Therefore, in the determination of changes in angular orientation of the light beam by means of shifting interference patterns, such a central area of the respective interference pattern may be selectively registered with the camera. The simultaneous additional determination of the interference of two partial beams with odd difference of reflections on the same image sensor of the camera additionally allows for the correction of shifts of the very image sensor relative to the partial beams, which may, for example, be caused by a heating up within the camera.

Practically, the at least two partial beams may be superimposed at an acute angle between their respective average propagation directions. The acute angle may be between 0.3° and 30° or more exactly between 1° and 10°. The acute angle in superimposing the partial beams may, for example, be simply realized in that an interferometer is used for splitting the light beam into the at least two partial beams and for superimposing the at least two partial beams, the interferometer being maladjusted by tilting one of its full mirrors or the beam splitter by half the desired acute angle.

An example of an interferometer suitable for carrying out the method according to the present disclosure is a Shear-interferometer comprising a wedge-shaped or a plane-parallel glass plate, wherein a plane-parallel glass plate of the Shear-interferometer requires the focusing of the light beam. A further example is a maladjusted Sagnac-interferometer in which, as a rule, the focusing of the light beam is required for forming an interference pattern with a plurality of intensity maxima in its central area on the camera. Also with a Michelson- or a Mach-Zehnder-interferometer, the focusing of the light beam in addition to the necessary maladjustment of the interferometer is an advantage. Further, the method according to the present disclosure may be carried out using a roof-shaped or pyramid-shaped glass plate for splitting the light beam into the at least two partial light beams and for superimposing the at least two partial light beams for forming the interference pattern. Here, the focusing of the light beam results in an advantageous two-dimensional distribution of the light intensity maxima over the camera even with only one roof-shaped glass plate.

Generally, the method according to the present disclosure is only suited for detecting changes in direction, i.e. particularly changes in angular orientation of the light beam in those directions, in which the light beam is split into the at least two partial beams and the partial beams are then superimposed to form the interference pattern, this means in the at least one transverse direction in which the intensity maxima of the interference pattern follow to one another. To detect changes in angular orientation of the light beam in all transverse directions with regard to the direction of main extension of the light beam, the light beam has, correspondingly, to be split up into at least three partial beams. Three partial beams may be superimposed in such a way that the interference pattern has a hexagonal two-dimensional arrangement of light intensity minima and maxima. Preferably, the light beam is split into at least four partial beams, and, for example, in a two-stage splitting in which the light beam is at first split into two parts which are then each split into two partial beams so that an entirety of four partial beams is obtained which are then superimposed such that the interference pattern has light intensity minima and maxima alternatingly following to one another in two transverse directions oriented transversely to the average propagation direction of the four partial beams and with regard to one another.

According to another aspect of the method according to the present disclosure, a part of the light beam is split into the at least two partial beams which are superimposed to form the interference pattern, wherein a further part of the light beam is split into at least two further partial beams which are superimposed to form a further interference pattern which has further light intensity minima and further light intensity maxima alternatingly following to one another in at least one further transvers direction oriented transversely to an average propagation direction of the at least two further light beams, wherein a part of the further interference pattern, the part including a plurality of further light intensity maxima, is registered by the camera or by a further camera. While the interference pattern with the intensity maxima following to one another in the at least one transverse direction makes it possible to detect changes in angular orientation in the at least one transverse direction; the further interference pattern with its light intensity maxima following to one another in the at least one further transverse direction, can make it possible to detect changes in angular orientation in the at least one further transverse direction. Thus, the changes in angular orientation can be separately detected in two transverse directions which are orthogonal to each other. Alternatively, the interference pattern and the further interference pattern may be formed in principally different ways.

For example, the at least two partial beams may be superimposed such that, with a change in direction of the light beam in the at least one transverse direction, the intensity maxima of the interference pattern shift with regard to the camera in a same sense in the at least one transverse direction, whereas the at least two further partial beams may be superimposed such that, with a change in direction of the light beam in the further transverse direction, the further intensity maxima of the further interference pattern move not at all or in opposite senses in the further transverse direction with regard to the camera or the further camera. Thus, the further interference pattern may be used for monitoring the stability of the optical setup which is used to implement the method according to the present disclosure. Here, for example, any shift of the camera or its image sensor relative to the optical setup may be detected and the measurement may be corrected with regard to the detected shift.

Practically, for the purpose that, with a change in direction of the light beam in the at least one further transverse direction, the further intensity maxima of the further interference pattern move not at all or in opposite senses in the at least one further transverse direction, the further part of the light beam can be split up into further partial beams which are $m_1$-times and $m_2$-times reflected, respectively, wherein the numbers $m_1$ and $m_2$ differ by an odd integer. Further, the interferometer or an interferometer, by which the further part of the light beam is split into the at least two further partial beams and the at least two further partial beams are superimposed to form the further interference pattern, may comprise at least one Dove-prism or a 50/50-beam splitter, which is used both for splitting into the two further partial beams and for superimposing of the two further partial beams, for forming such an interference pattern which does not "shift" as a whole with a change in direction of the light beam.

In the aspect of the method according to the present disclosure explained here, the interference pattern and the further interference pattern may not only be imaged or formed side by side, i.e. spatially separated on one and the same camera, but they may also be superimposed there to form an overall interference pattern which may indicate both changes in direction of the light beam and any other changes of the optical setup used for implementing the method according to the present disclosure.

An apparatus according to the present disclosure for detecting changes in direction of a collimated coherent light beam comprises an interferometer which is configured for splitting the light beam into at least two partial beams and for superimposing the at least two partial beams for forming an interference pattern which has light intensity minima and light intensity maxima alternatingly following to one another in at least one transverse direction oriented transversely to an average propagation direction of the at least two partial beams, and a camera which registers at least a part of the interference pattern including a plurality of the intensity maxima and which is configured to detect changes in position of the light intensity maxima with regard to the camera.

In the apparatus according to the present disclosure, a focusing optic is configured and arranged for focusing the collimated light beam into at least one focus located in front of the camera. This focusing optic may be arranged upstream or in front of the interferometer, i.e. on that side of the interferometer facing away from the camera.

In one embodiment, the camera is not arranged for detecting the entire interference pattern but for detecting a central area of the interference pattern only, in which the intensity maxima follow regularly to one another in the at least one transverse direction and which completely covers the camera even after changes in direction, like changes in angular orientation of the light beam.

For example, the interferometer of the apparatus is a Shear-interferometer with a wedge-shaped or plane-parallel glass plate, a maladjusted Sagnac-interferometer, a maladjusted Michelson-interferometer or a maladjusted Mach-Zehnder-interferometer, or it has a roof-shaped or pyramid-shaped glass plate. Each of said interferometers may be configured to reflect the at least two partial beams $n_i$-times, wherein the numbers $n_i$ of the reflections do not differ at all or differ by an even integer. This results in an interference pattern which, with a change in angular orientation of the light beam, is moved as a whole or "shifts" in the transverse direction of the change in angular orientation with regard to the camera. This shift is detected at each of the light intensity maxima and thus at an accuracy increased by the factor $\sqrt{N}$, wherein N is the number of the intensity maxima.

Further, the interferometer may be configured for splitting the light beam into four partial beams and for superimposing the four partial beams such that the interference pattern comprises light intensity minima and light intensity maxima following to one another in two transverse directions oriented transversely to the average propagation direction of the four partial beams and transverse to each other. Thus, changes in position of the light intensity maxima in the two transverse directions indicate changes in direction of the light beam with regard to its direction of main extension in both transverse directions.

Alternatively or additionally, the interferometer may be configured for splitting a part of the light beam into the at least two partial beams which it superimposes to form the interference pattern, whereas it splits a further part of the light beam into at least two further partial beams which it superimposes to form a further interference pattern displaying further intensity maxima and further intensity minima following to one another in at least one further transverse direction oriented transversely to the average propagation direction of the at least two further partial beams, wherein the camera or a further camera registers at least a part of the further interference pattern including a plurality of the further light intensity maxima. Here, the interferometer may be configured for superimposing the two partial beams such that, with a change in direction of the light beam in the at least one transverse direction, the intensity maxima of the interference pattern shift in a same sense in the at least one transverse direction with regard to the camera, whereas it superimposes the at least two further partial beams such that, with a change in direction of the light beam in the further transverse direction, the further intensity maxima of the further interference pattern move not at all or in opposite senses in the further transverse direction with regard to the camera or the further camera. For this purpose, the interferometer may be configured for reflecting the further part of the light beam in the two further partial beams $m_1$-times $m_2$-times, respectively, wherein the numbers $m_1$ and $m_2$ differ by an odd integer. This may be realized by means of a Dove-Prism or a 50/50-beam splitter.

The interferometer may further be configured for imaging the part of the interference pattern and the part of the further interference pattern side by side or at least partially overlapping onto one and the same camera, wherein an overall interference pattern is formed in the area of the overlap.

A beam stabilizer for stabilizing the angular orientation of a collimated coherent light beam according to the present disclosure comprises an apparatus for detecting changes in direction of the collimated coherent light beam according to the present disclosure. Such a beam stabilizer or any other apparatus according to the present disclosure may be used in a laser-scanning microscope comprising a laser supplying a collimated coherent light beam.

With regard to further details of the apparatus according to the present disclosure or of the beam stabilizer or the laser-scanning microscope including this apparatus reference is made to the above described embodiments of the method according to the present disclosure and the following detailed description of the drawings.

Figure 1:
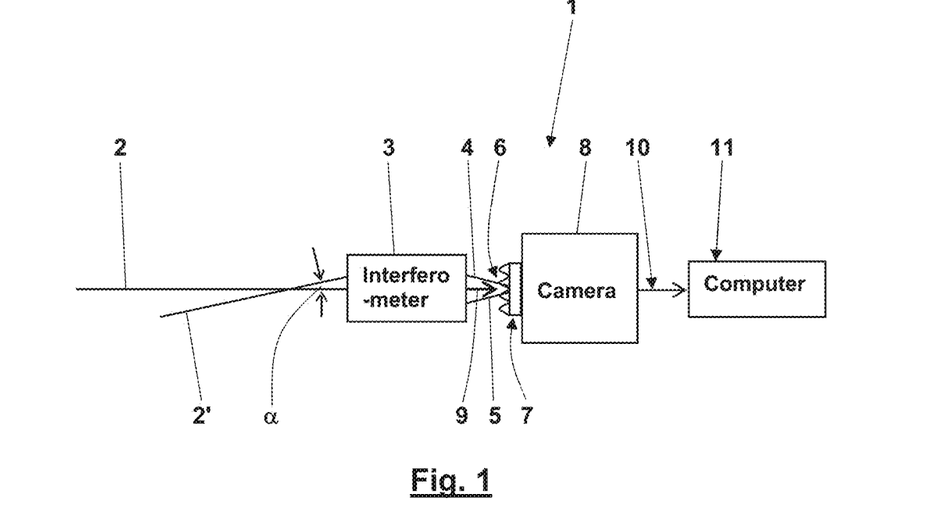
FIG. 1 schematically shows an apparatus according to the present disclosure for carrying out the method according to the present disclosure.

Referring now in greater detail to the drawings, the apparatus 1 depicted in FIG. 1 serves for detecting changes in direction of a coherent light beam 2. This particularly relates to a change in angular orientation of the light beam 2, which is indicated in FIG. 1 in form of a beam angle α, at which the light beam 2' is oriented with regard to the light beam 2. The apparatus 1 includes an interferometer 3 which splits the light beam 2 into at least two partial beams 4 and 5 and which afterwards superimposes these partial beams 4 and 5 on an image sensor 7 of a camera 3 to form an interference pattern 6. In at least one transverse direction which is oriented transversely to an average propagation direction 9 of the partial beams 4 and 5, the interference pattern 6 has light intensity minima and light intensity maxima which alternately follow to one another and of which a plurality is arranged on the image sensor 7 of the camera 3. The image sensor 7 detects this plurality of light intensity maxima in a central area of the interference pattern 6. Images 10 of the camera are evaluated by, for example, a computer 11 to determine changes in position of the light intensity maxima with regard to the camera and to deduce on the beam angle α from these changes in position.

Figure 2:
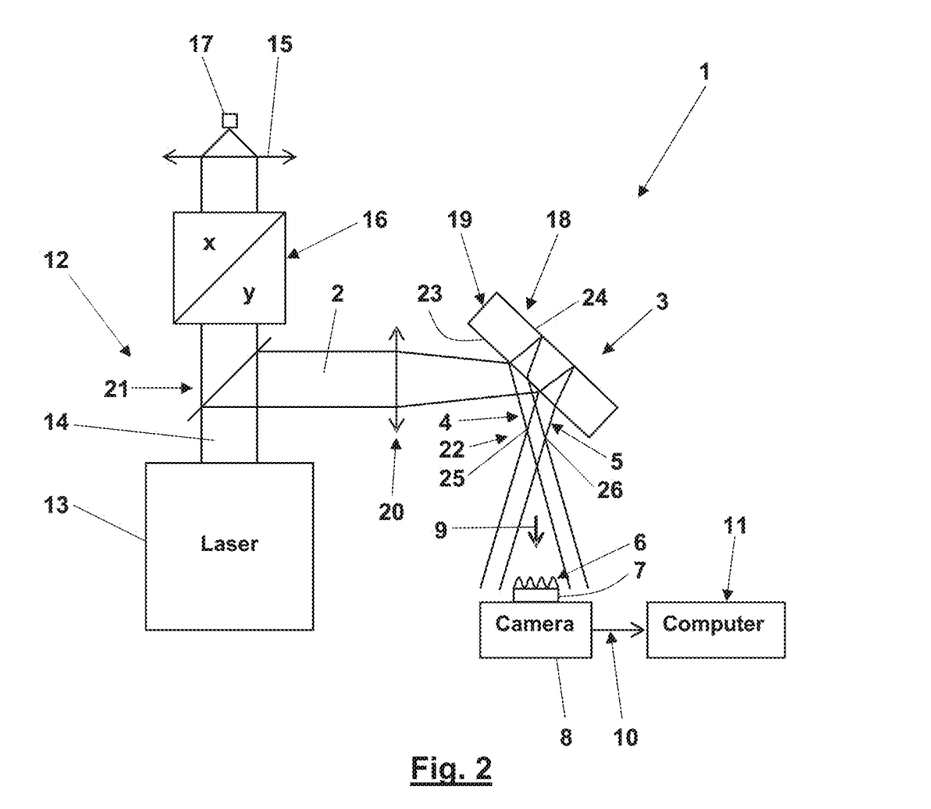
FIG. 2 shows an embodiment of the apparatus according to the present disclosure comprising a Shear-interferometer as a part of a beam stabilizer of a laser-scanning microscope.

FIG. 2 schematically shows parts of a laser-scanning microscope 12 in which a laser 13 provides a laser beam 14 as the light beam 2 in form of. By means of an objective lens 15, the laser beam 14 is focused, and by means of a scanner 16 the laser beam 14 is moved in the focal plane of the objective 15 to scan a sample 17 with the focused laser beam 14. The apparatus 1 is provided for monitoring and, if necessary, correcting the beam angle of the laser beam 14. In the present embodiment, its interferometer 3 includes a Shear-interferometer 18 comprising a plane-parallel glass plate 19, in front of which a focusing optic 20 is arranged. The focusing optic 20 focuses a part of the laser beam 24 as the light beam 2, which is coupled out of the laser-scanning microscope 12 by means of a beam splitter 21. As the focus 22 of the focusing optic 20 is located behind the Shear-interferometer 18, the partial beams 4 and 5 of the light beam 2 reflected by the front side 23 and the back side 24 of the plane-parallel glass plate 19 form two focus points 25 and 26 from which the partial beams 4 and 5 propagate as overlapping spherical waves. In this way, the partial beams 4 and 5 form the interference pattern 6 on the image sensor 7 of the camera 8. With a change in direction of the laser beam 14 in the drawing plane of FIG. 2, the plurality of the light intensity maxima of this interference pattern 6 shifts relative to the camera 8 in a transverse direction oriented transversely to the average propagation direction 9 in the drawing plane of FIG. 2. Here, as a first approximation, the amount of an average shift of the individual light intensity maxima of the interference pattern 6, except of a proportionality factor, corresponds to the value of the change in beam angle α by which the laser beam 14 has been tilted in the drawing plane of FIG. 2. Due to the collimated laser beam 14 or the collimated light beam 2 being focused by means of the focusing optic 20, lateral movements of the laser beam 14, as a first approximation, have no effect on the interference pattern 16, particularly on its central area. Instead, the apparatus 1 is essentially only sensitive to changes in angular orientation of the laser beam 14. If changes in beam angle introduced by the scanner 16 are also to be detected, the scanner 16 may also be arranged between the beam splitter 21 and the laser 13 in the laser-scanning microscope 12.

Figure 3:
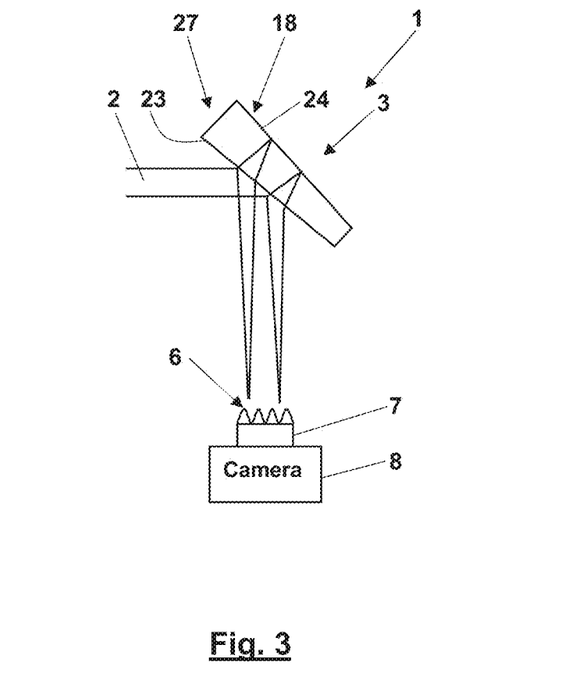
FIG. 3 shows a further embodiment of the apparatus according to the present disclosure comprising a Shear-interferometer with a wedge-shaped glass plate.

FIG. 3 schematically shows a further embodiment of the apparatus 1 based on a Shear-interferometers 18. This Shear-interferometer 18 has a wedge-shaped glass plate 27 and does without the focusing optic 20. Nevertheless, the focusing optic 20 could also be provided here to make the apparatus 1 only sensitive to changes in angular orientation of the light beam 2.

Figure 4:
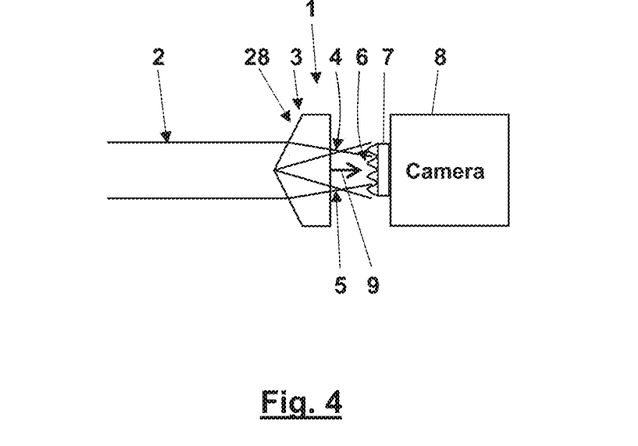
FIG. 4 shows an embodiment of the apparatus according to the present disclosure comprising a roof-shaped glass plate.

FIG. 4 illustrates an embodiment of the apparatus 1 based on a roof-shaped glass plate 28 which splits the light beam 2 into the partial beams 4 and 5 and which superimposes the partial beams 4 and 5 to form the interference pattern 6.

Figure 5:
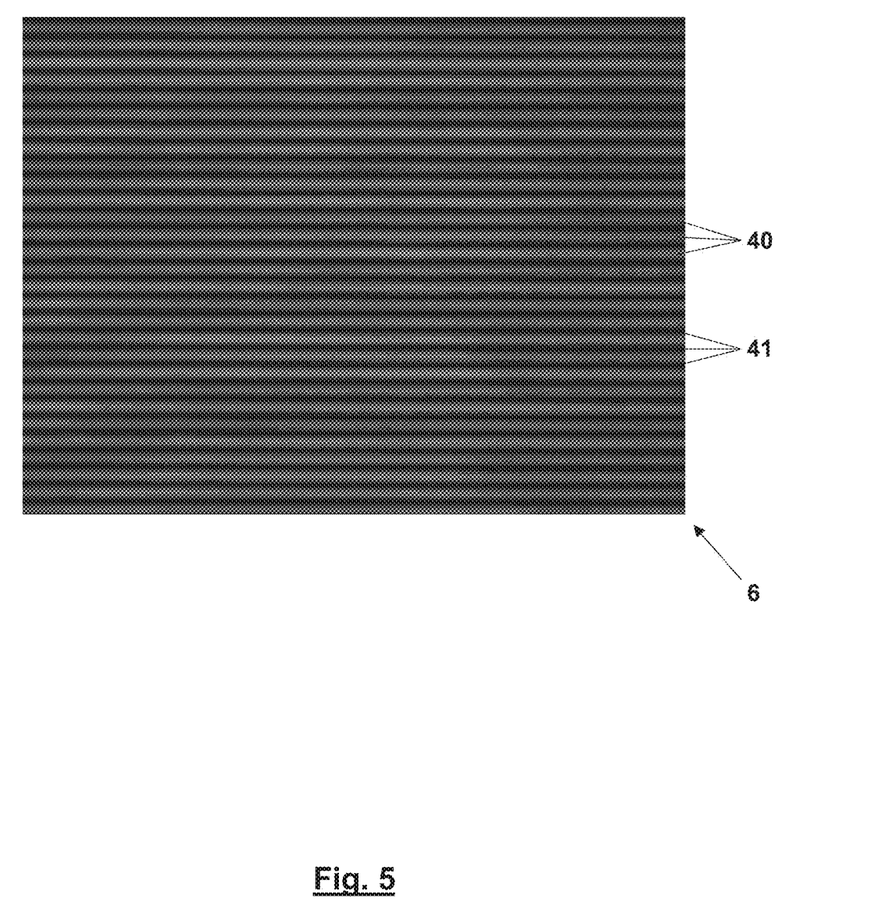
FIG. 5 shows an interference pattern which has been recorded by a camera of the embodiment of the apparatus of FIG. 4.

FIG. 5 shows the interference pattern 6 which has been recorded by the camera 8 of the apparatus 1 according to FIG. 4. It consists of a plurality of stripe-shaped intensity maxima 40 and intensity minima 41 which are parallel to a ridge of the roof-shaped glass plate 28 according to FIG. 4.

Figure 6:
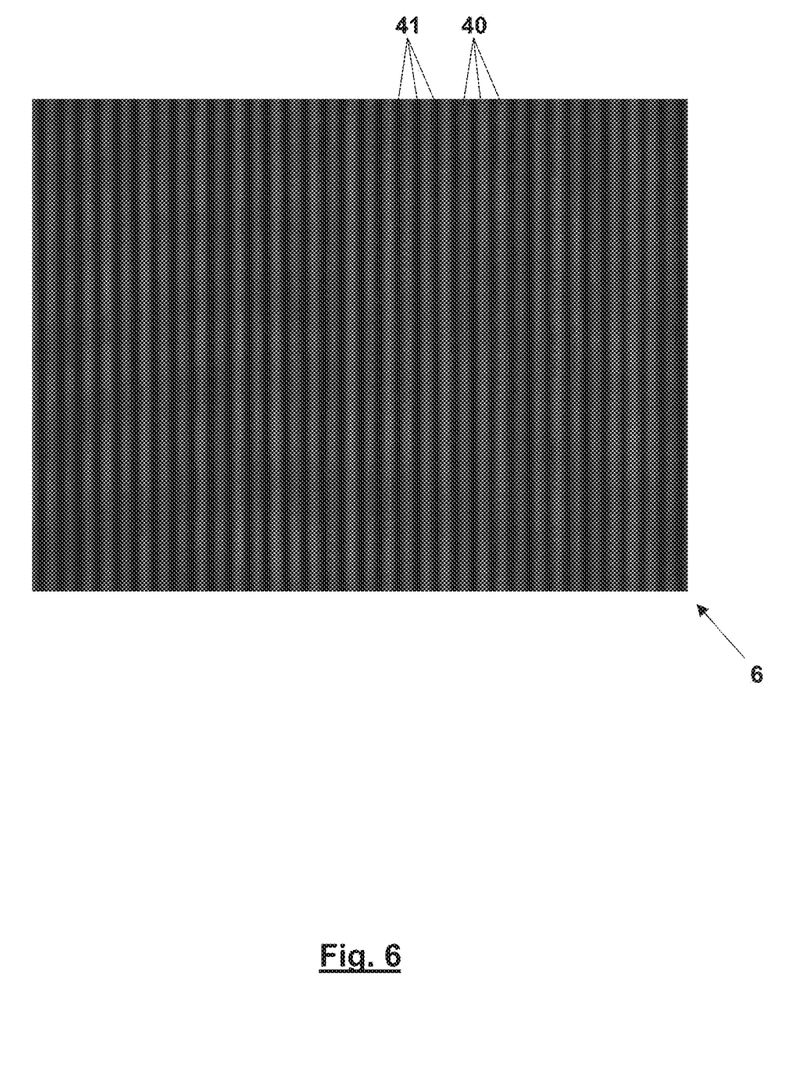
FIG. 6 shows an interference pattern which has been recorded by the camera in an embodiment of the apparatus according to the present disclosure in which the roof-shaped glass plate has been rotated by 90° with regard to FIG. 4.

FIG. 6 shows an interference pattern 6 as recorded by the camera 8 according to FIG. 4, if the roof-shaped glass plate 28 is rotated by 90° about the average propagation direction 9. Correspondingly, the stripe-shaped intensity maxima 40 and intensity minima 41 are oriented transversely to the stripe-shaped intensity maxima 40 and intensity minima 41 according to FIG. 5.

Figure 7:
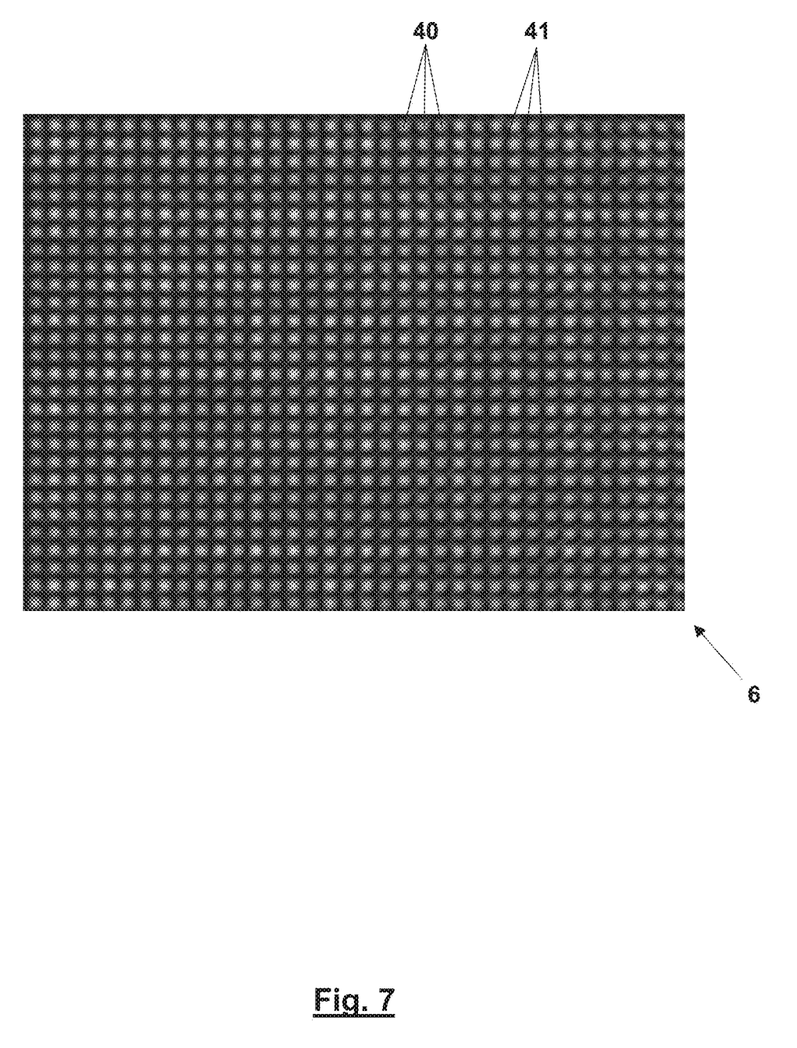
FIG. 7 shows an interference pattern which has been recorded by the camera of an embodiment of the apparatus according to the present disclosure which comprises two roof-shaped glass plates which follow to one another and which are rotated by 90° with regard to one another.

FIG. 7 shows an interference pattern 6 which results if, in the embodiment of the apparatus 1 of FIG. 4, two roof-shaped glass plates 28 which are rotated by 90° about the average propagation direction 9 with regard to each other are arranged in front of the camera 8 such that the roof ridges of the roof-shaped glass plates, in a projection along the average propagation direction 9, are orthogonal to one another. This arrangement results in point-shaped intensity maxima 40 which are enclosed by a grating of intensity minima 41. The positions of the intensity minima 40 in the interference pattern 6, with regard to the camera 8, change with the beam angle of the light beam 2 and, in fact, in the same direction.

Instead of two roof-shaped glass plates connected in series to split the light beam 2 in two transverse directions which are orthogonal to each other into a total of four partial beams and to then superimpose the four partial beams to form the interference pattern to detect the changes in direction of the light beam 2 not only in the one but also in the further transverse direction oriented orthogonally thereto, a pyramid-shaped glass plate can be used instead of the roof-shaped glass plate 28 in the apparatus 1 of FIG. 4.

Figure 8:
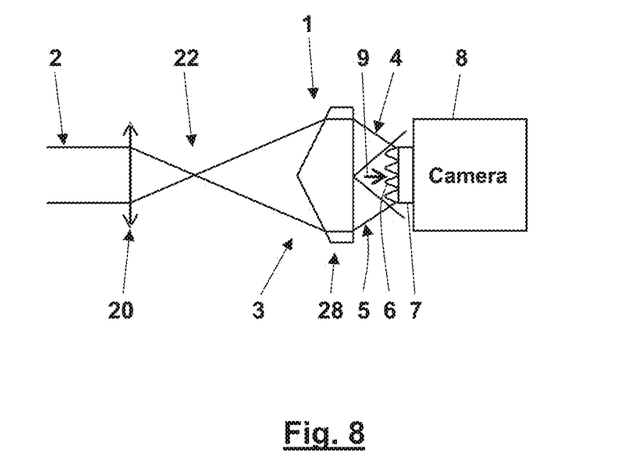
FIG. 8 shows an embodiment of the apparatus according to the present disclosure comprising a roof-shaped glass plate and an upstream focusing optic.

As shown in FIG. 8, the roof-shaped glass plate 28 may be combined with a focusing optic 20, whose focus 22 is located in front of the roof-shaped glass plate 28 here, in order to make the apparatus only sensitive to changes in angular orientation of the light beam 2, on the one hand, and to increase the effective beam cross-section of the light beams 4 and 5 in its superposition to form the interference pattern 6, on the other hand. This results in a higher number of intensity maxima within the central area of the interference pattern 6 detected by the image sensor 7.

Figure 9:
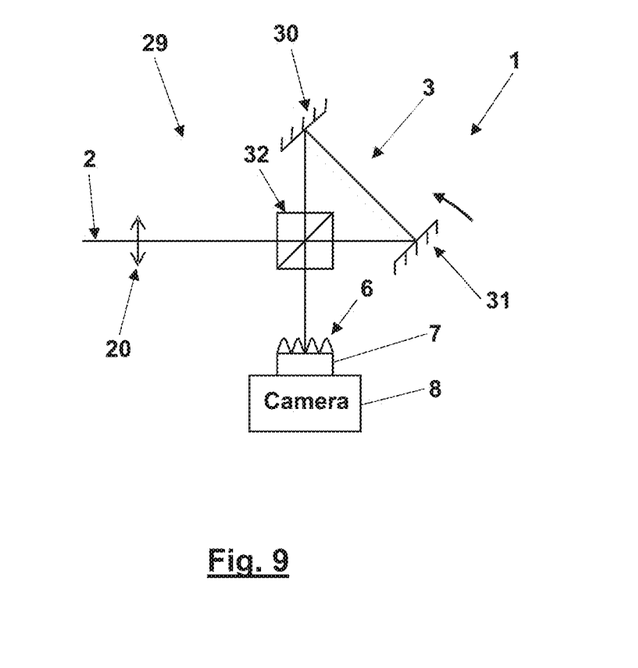
FIG. 9 shows an embodiment of the apparatus according to the present disclosure comprising a Sagnac-interferometer with two full mirrors and an upstream focusing optic.

FIG. 9 shows an embodiment of the apparatus 1 based on a Sagnac-interferometer 29 comprising two full mirrors 30 and 31 besides a beam splitter 32. One of the full mirrors 31 is maladjusted as indicated by a rotation arrow to form the interference pattern 6 with a plurality of light intensity maxima on the image sensor 7 of the camera 8, which would not be formed with a perfectly adjusted Sagnac-interferometer 29. The formation of a large area interference pattern 6, in which a synchronous change in position of the light intensity maxima in one transverse direction selectively indicates a change in angular orientation of the incident light beam 2 in the transverse direction is achieved by means of the focusing optic arranged in front of the Sagnac-interferometer 29.

Figure 10:
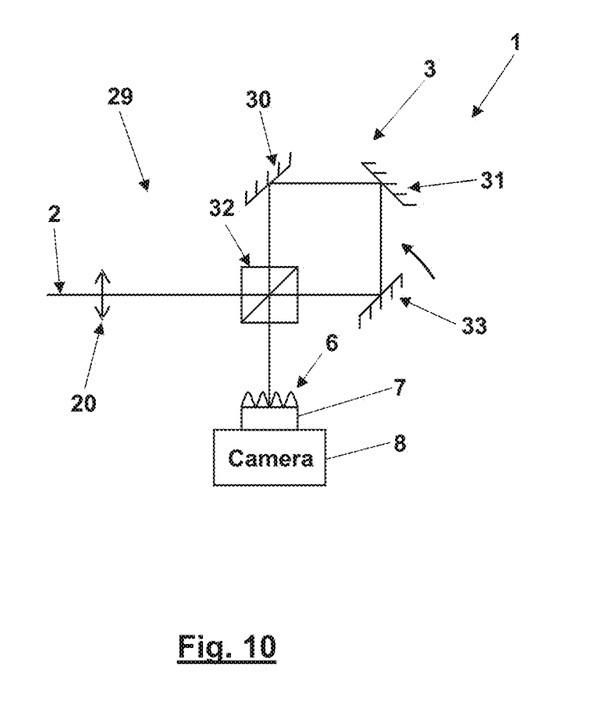
FIG. 10 shows an embodiment of the apparatus according to the present disclosure comprising a Sagnac-interferometer with three full mirrors and an upstream focusing optic.

FIG. 10 shows an embodiment of the apparatus 1 comprising a Sagnac-interferometer 29 with three full mirrors 30, 31 and 33 besides the beam splitter 32, wherein, here, the full mirror 23 is slightly tilted such that the interference pattern 6 is formed on the image sensor 7 of the camera 8. For the reasons explained with reference to FIG. 9, the focusing optic 20 is also arranged in front of this Sagnac-interferometer 29.

Figure 11:
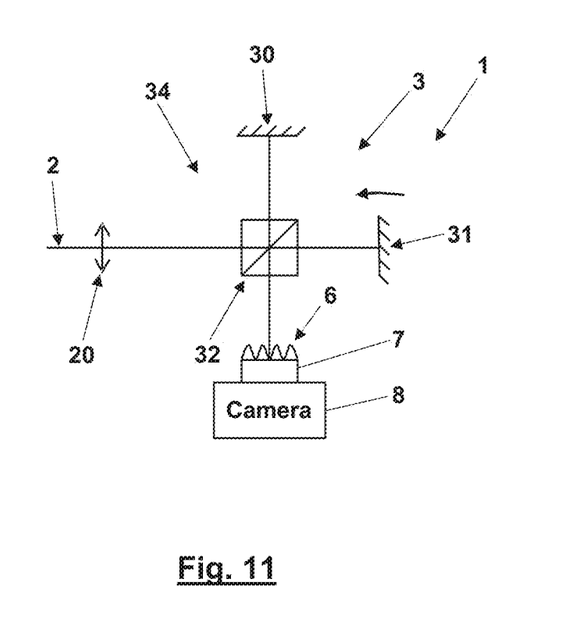
FIG. 11 shows an embodiment of the apparatus according to the present disclosure comprising a Michelson-interferometer and an upstream focusing optic.

FIG. 11 shows an embodiment of the apparatus 1 based on a Michelson-interferometer comprising two full mirrors 30 and 31, of which the full mirror 31 is maladjusted, besides a beam splitter 32. Once again, the interference pattern 6 is formed on the image sensor 7 due to the maladjustment of the full mirror 31, and the focusing optic 20 is arranged in front of the Michelson-interferometer 24 to make the apparatus 1 selectively sensitive to changes in angular orientation of the light beam 2 and to ease the formation of a large area interference pattern 6.

Figure 12:
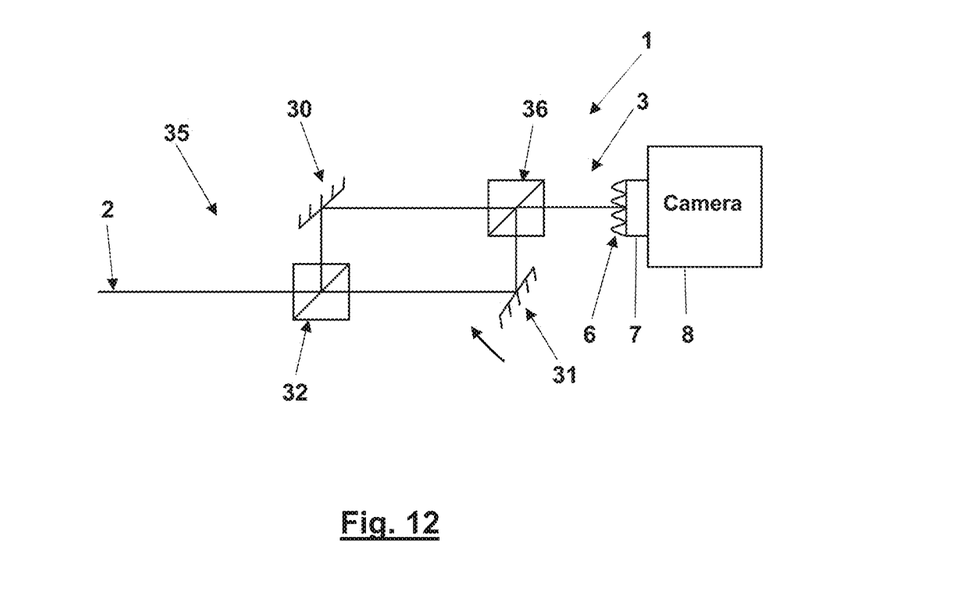
FIG. 12 shows an embodiment of the apparatus according to the present disclosure comprising a Mach-Zehnder-interferometer.

In the apparatus 1 of FIG. 12 which is based on a Mach-Zehnder-interferometer 35, a focusing optic 20 could also be arranged in front of the interferometer 3. However, this is not the case here. The Mach-Zehnder-interferometer 35, besides an input-side beam splitter 32 and two full mirrors 30 and 31 of which the full mirror 31 is maladjusted to form the interference pattern 6 on the image sensor 7 of the camera 8, comprises an additional output-side beam splitter 36 in a generally known arrangement.

Figure 13:
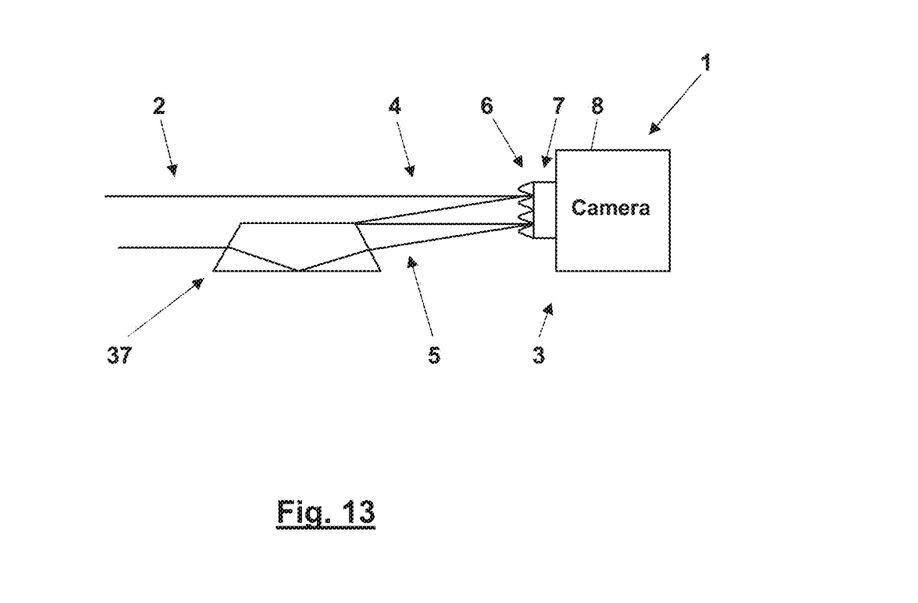
FIG. 13 shows an apparatus according to the present disclosure comprising a Dove-Prism.

In the apparatus 1 of FIG. 13, a Dove-prism 37 is arranged such that it covers a half of the beam cross-section of the light beam 2 and selectively deviates the respective partial beam 5 and superimposes the respective partial beam 5 with the other partial beam 4 to form the interference pattern 6 on the image sensor 7 of the camera 8. In this case, the interference pattern 6 does not move as a whole in the transverse direction in which a change in direction of the light beam 2 occurs. Instead, the distance of the intensity maxima in this transverse direction changes with the change in direction of the light beam 2. The average position of the light intensity maxima with regard to the camera essentially remains constant in this case.

Figure 14:
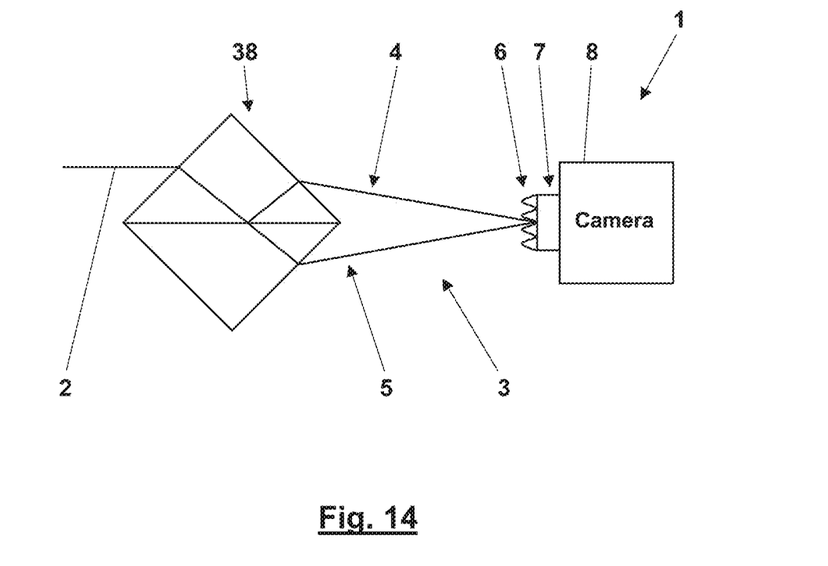
FIG. 14 shows an apparatus according to the present disclosure comprising a 50/50-beam splitter cube.
Figure 15:
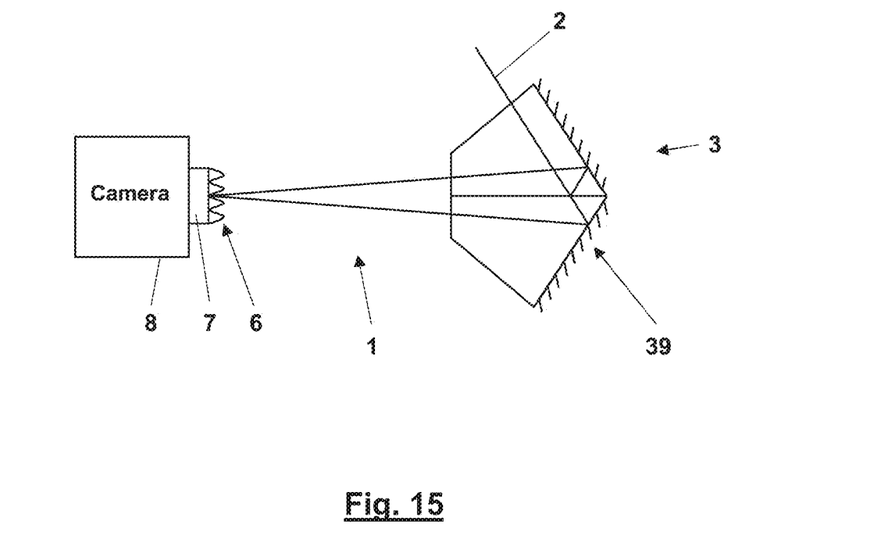
FIG. 15 shows an embodiment of the apparatus according to the present disclosure comprising a 50/50-beam splitter prism.

Both an interference pattern 6 which, in the apparatus 1 of FIG. 14, is generated by means of a 50/50-beam splitter cube 38 and an interference pattern 6 which, in the apparatus 1 of FIG. 15, is generated by means of a 50/50-prism 39 show the same behavior as the interference pattern 6 which is generated by the apparatus 1 of FIG. 13. An embodiment of the apparatus 1 of one of the FIGS. 13 to 15 may be provided in addition to one of the embodiments of one of the FIGS. 2 to 4 and 8 to 12 to form a further interference pattern as a reference on a same or a further camera 8. This further interference pattern may also be superimposed with the interference pattern 6 generated by the apparatus of one of the FIGS. 2 to 4 and 8 to 12 on the camera 8 to form an overall interference pattern.

Many variations and modifications may be made to the preferred embodiments of the invention without departing substantially from the spirit and principles of the invention. All such modifications and variations are intended to be included herein within the scope of the present invention, as defined by the following claims.

I claim:

1. A method of detecting changes in direction of a collimated coherent light beam, the method comprising
    splitting the light beam into at least two partial light beams,
    superimposing the at least two partial light beams to form a spatial interference pattern displaying a plurality of light intensity minima and light intensity maxima alternatingly following to one another in at least one transverse direction oriented transversely to an average propagation direction of the at least two partial beams,
    focusing the superimposed at least two light beams into at least one focus positioned in front of a camera,
    registering pictures of at least a part of the spatial interference pattern including a plurality of the light intensity maxima with the camera,
    analyzing the spatial interference pattern to determine an average shift of the plurality of light intensity maxima in the at least one transverse direction from the pictures registered with the camera, and
    deducing a change in angular orientation of the collimated coherent light beam in the at least one transverse direction from the average shift of the plurality of light intensity maxima in the at least one transverse direction.

2. The method of claim 1, wherein the light beam is focused prior to splitting the light beam into the two partial beams.

3. The method of claim 1, wherein each of the at least two partial beams is reflected $n_i$-times, wherein $n_i$ is a number of reflections of the i-th partial beam of the at least two partial beams, and wherein all $n_i$ are non-negative integers and differ by zero or an even number.

4. The method of claim 1, wherein, additionally, a variation of an average distance of the plurality of the light intensity maxima in the at least one transverse direction is determined from the pictures registered with the camera.

5. The method of claim 1, wherein the part of the interference pattern, whose pictures are registered with the camera, is a central area of the interference pattern.

6. The method of claim 1, wherein the at least two partial beams are superimposed at an acute angle between average propagation directions of the at least two partial beams, wherein the acute angle is in at least one range from 0.3° to 30° and from 1° to 10°.

7. The method of claim 1, wherein the light beam is split into four partial beams including the at least two partial beams, wherein the four partial beams are superimposed such as to form the interference pattern displaying the light intensity maxima and light intensity minima alternatingly following to one another in two transverse directions including the at least one transverse direction, the two transverse directions oriented transversely to the average propagation direction of the four light beams and transversely with regard to each other.

8. The method of claim 1, wherein a part of the light beam is split into the at least two partial beams which are superimposed such as to form the spatial interference pattern, whereas a further part of the light beam is split into at least two further partial beams which are superimposed such as to form a further spatial interference pattern displaying further intensity maxima and further intensity minima following to one another in a further transverse direction oriented transversely to the average propagation direction of the at least two further partial beams, wherein pictures of at least a part of the further spatial interference pattern including a plurality of the further light intensity maxima is registered with the camera or with a further camera.

9. The method of claim 7, wherein the at least two partial beams are superimposed such that, with a change in direction of the light beam in the at least one transverse direction, the intensity maxima of the spatial interference pattern all shift in a same sense in the at least one transverse direction, whereas the at least two further partial beams are superimposed such that, with a change in direction of the light beam in the at least one further transverse direction, the further intensity maxima of the further intensity interference pattern move not at all or in opposite senses in the at least one further transverse direction, in that the at least two further partial beams are deflected $m_1$-times and $m_2$-times, respectively, wherein the numbers $m_1$ and $m_2$ are non-negative integers and differ by an odd number.

10. An apparatus for detecting changes in direction of a collimated coherent light beam, the apparatus comprising
    an interferometer configured and arranged for splitting the light beam into at least two partial light beams and for superimposing the at least two partial light beams such as to form a spatial interference pattern displaying a plurality of intensity minima and intensity maxima alternatingly following to one another in at least one transverse direction oriented transversely to an average propagation direction of the at least two partial beams,
    a camera configured and arranged for registering pictures of at least a part of the spatial interference pattern including a plurality of the intensity maxima,
    a focusing optic configured and arranged for focusing the superimposed at least two light beams into at least one focus positioned in front of the camera, and
    an evaluation device configured for analyzing the spatial interference pattern and from the spatial interference pattern, determining an average shift of the plurality of light intensity maxima in the at least one transverse direction from the pictures registered with the camera, and deducing a change in angular orientation of the collimated coherent light beam from the average shift of the plurality of light intensity maxima.

11. The apparatus of claim 10, wherein the focusing optic is arranged in front of the interferometer.

12. The apparatus of claim 10, wherein the camera is arranged to register the pictures of a central area of the interference pattern.

13. The apparatus of claim 10, wherein the interferometer includes at least one of
    a Shear-interferometer having a wedge-shaped or plane-parallel glass plate,
    a maladjusted Sagnac-interferometer,
    a maladjusted Michelson-interferometer,
    a maladjusted Mach-Zehnder-interferometer,
    a roof-shaped glass plate or
    a pyramid-shaped glass plate.

14. The apparatus of claim 10, wherein the interferometer is configured to reflect each of the at least two partial beams $n_i$-times, wherein $n_i$ is a number of reflections of the i-th partial beam of the at least two partial beams, and wherein all $n_i$ are non-negative integers and differ by zero or an even number.

15. The apparatus of claim 10, wherein the interferometer is configured to split the light beam into four partial beams including the at least two partial beams, and to superimpose the four partial beams such that the formed interference pattern displays light intensity minima and light intensity maxima alternatingly following to one another in two transverse directions oriented transversely to the average propagation direction of the four partial beams and transversely to each other.

16. The apparatus of claim 10, wherein the interferometer is configured to split a part of the light beam into the at least two partial light beams which are superimposed such as to form the interference pattern, whereas the interferometer is configured to split a further part of the light beam into at least two further partial beams and superimposes the at least two further partial beams such as to form a further interference pattern which displays further light intensity maxima and further light intensity minima alternatingly following to one another in at least one further transverse direction oriented transversely to an average propagation direction of the at least two further partial beams, wherein the camera is configured or a further camera is provided and configured to register pictures of at least a part of the further interference pattern including a plurality of the further light intensity maxima.

17. The apparatus of claim 16, wherein the interferometer is configured to superimpose the at least two partial beams such that, with a change in direction of the light beam in the at least one transverse direction, the intensity maxima of the interference pattern shift with regard to the camera in a same sense in the at least one transverse direction, whereas the interferometer is configured to superimpose the at least two further partial beams such that, with a change in direction of the light beam in the further transverse direction, the further intensity maxima of the further interference pattern move not at all or in opposite senses in the further transverse direction with regard to the camera or the further camera, in that the interferometer is configured to split the further part of the light beam into two further partial beams and to reflect the two further partial beams $m_1$-times and $m_2$-times, respectively, wherein the number $m_1$ and $m_2$ of reflections are non-negative integers and differ by an odd number.

18. The apparatus of claim 17, wherein the interferometer, for splitting the further part of the light beam into the at least two further partial beams and for superimposing the at least two further partial beams such as to form the further interference pattern, includes at least one of a Dove-prism or a 50/50-beam splitter.

19. A laser-scanning microscope comprising
a laser providing a collimated coherent light beam; and
an apparatus for detecting changes in direction of the collimated coherent light beam, the apparatus comprising
an interferometer configured and arranged for splitting the light beam into at least two partial light beams and for superimposing the at least two partial light beams such as to form a spatial interference pattern displaying a plurality of light intensity minima and intensity maxima alternatingly following to one another in at least one transverse direction oriented transversely to an average propagation direction of the at least two partial beams,
a camera configured and arranged for registering pictures of at least a part of the spatial interference pattern including a plurality of the light intensity maxima,
a focusing optic configured and arranged for focusing the superimposed at least two light beams into at least one focus positioned in front of the camera, and
an evaluation device configured for analyzing the spatial interference pattern and from the spatial interference pattern, determining an average shift of the plurality of light intensity maxima in the at least one transverse direction from the pictures registered with the camera, and deducing a change in angular orientation of the collimated coherent light beam from the average shift of the plurality of light intensity maxima.

20. The method of claim 1, wherein splitting the light beam into at least two partial light beams comprises splitting the light beam into at least two partial light beams with an interferometer having a roof-shaped glass plate.

* * * * *